United States Patent
Aokage

(10) Patent No.: US 9,282,249 B2
(45) Date of Patent: Mar. 8, 2016

(54) IMAGE PROCESSING APPARATUS THAT TRANSMITS IMAGE DATA OUTSIDE THE APPARATUS

(71) Applicant: CANON KABUSHIKI KAISHA, Tokyo (JP)

(72) Inventor: Hironori Aokage, Yashio (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/031,429

(22) Filed: Sep. 19, 2013

(65) Prior Publication Data

US 2014/0016000 A1    Jan. 16, 2014

Related U.S. Application Data

(63) Continuation of application No. PCT/JP2013/060793, filed on Apr. 10, 2013.

(30) Foreign Application Priority Data

Apr. 26, 2012  (JP) .................................. 2012-101667
Apr. 26, 2012  (JP) .................................. 2012-101668

(51) Int. Cl.
*H04N 5/232*    (2006.01)

(52) U.S. Cl.
CPC ....... *H04N 5/23293* (2013.01); *H04N 5/23235* (2013.01)

(58) Field of Classification Search
CPC ...................... H04N 5/23293; H04N 5/23235
USPC ................... 348/207.1, 231.5, 231.6
See application file for complete search history.

(56) References Cited

U.S. PATENT DOCUMENTS

| 6,273,535 | B1 * | 8/2001 | Inoue et al. ...................... 347/3 |
| 7,286,167 | B2 * | 10/2007 | Sakamoto et al. .......... 348/231.6 |
| 2001/0022624 | A1 * | 9/2001 | Tanaka et al. ............. 348/333.02 |
| 2003/0098915 | A1 | 5/2003 | Hyodo et al. |
| 2003/0108337 | A1 * | 6/2003 | Tsuchida et al. ................. 386/95 |
| 2012/0256943 | A1 * | 10/2012 | Atkins et al. ................... 345/590 |

FOREIGN PATENT DOCUMENTS

| JP | 2003-169289 A | 6/2003 |
| JP | 2008-22049 A | 1/2008 |
| JP | 2009-77347 A | 4/2009 |

* cited by examiner

*Primary Examiner* — Nelson D. Hernández Hernández
(74) *Attorney, Agent, or Firm* — Canon U.S.A., Inc. IP Division

(57) ABSTRACT

An image processing apparatus includes generating means for generating image data, transmitting means for transmitting predetermined image data to an external device, the predetermined image data being generated by performing a predetermined process for pixel range conversion on the image data, and control means for performing control such that predetermined data relating to the predetermined image data generated by the predetermined process and the predetermined image data are transmitted to the external device.

15 Claims, 9 Drawing Sheets

FIG. 6

| byte | |
|---|---|
| HB0 | InfoFrameType=0x81 |
| HB1 | VERSION OF InfoFrame=0x01 |
| HB2 | LENGTH OF InfoFrame=0x11 |
| PB0 | Vendor ID=0x01 |
| PB1 | |
| PB2 | |
| PB3 | FRAME NUMBER IN TIME CODE |
| PB4 | SECOND IN TIME CODE |
| PB5 | MINUTE IN TIME CODE |
| PB6 | HOUR IN TIME CODE |
| PB7 | FIRST FRAME RATE |
| PB8 | SECOND PIXEL RANGE |
| PB9 | FIRST DIGIT IN CHARACTER PORTION OF FILE NAME |
| PB10 | SECOND DIGIT IN CHARACTER PORTION OF FILE NAME |
| PB11 | THIRD DIGIT IN CHARACTER PORTION OF FILE NAME |
| PB12 | FOURTH DIGIT IN CHARACTER PORTION OF FILE NAME |
| PB13 | FIRST DIGIT IN NUMERIC CHARACTER PORTION OF FILE NAME |
| PB14 | SECOND DIGIT IN NUMERIC CHARACTER PORTION OF FILE NAME |
| PB15 | THIRD DIGIT IN NUMERIC CHARACTER PORTION OF FILE NAME |
| PB16 | FOURTH DIGIT IN NUMERIC CHARACTER PORTION OF FILE NAME |

FIG. 8

FILE NAME=MVI_0001

| HEADER INFORMATION<br>30p, 16-255 |
| --- |
| TIME CODE FOR FRAME 1 |
| IMAGE DATA FRAME 1 |
| TIME CODE FOR FRAME 2 |
| IMAGE DATA FRAME 2 |
| TIME CODE FOR FRAME 3 |
| IMAGE DATA FRAME 3 |

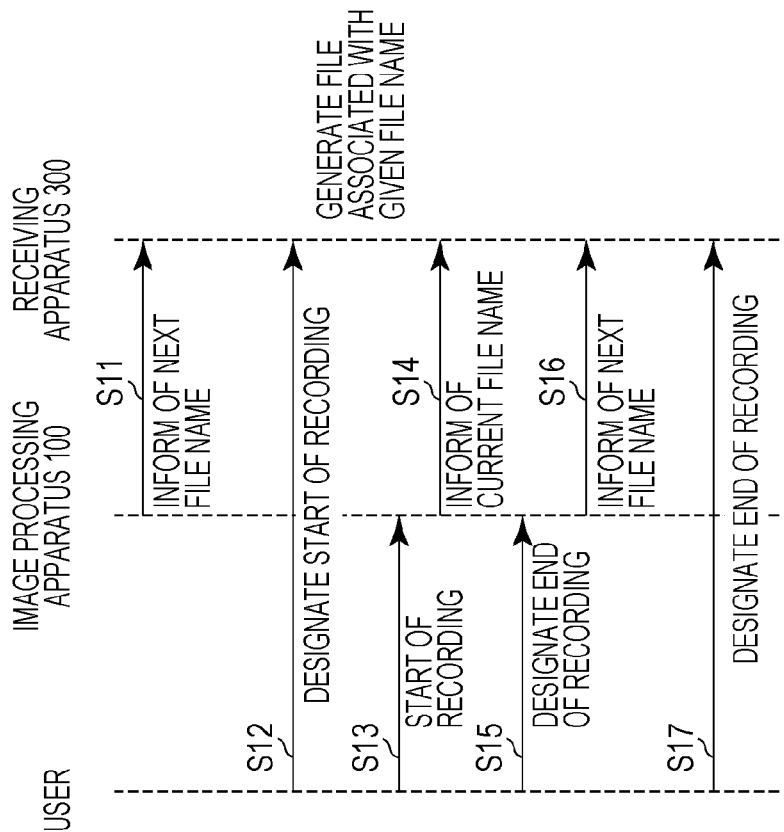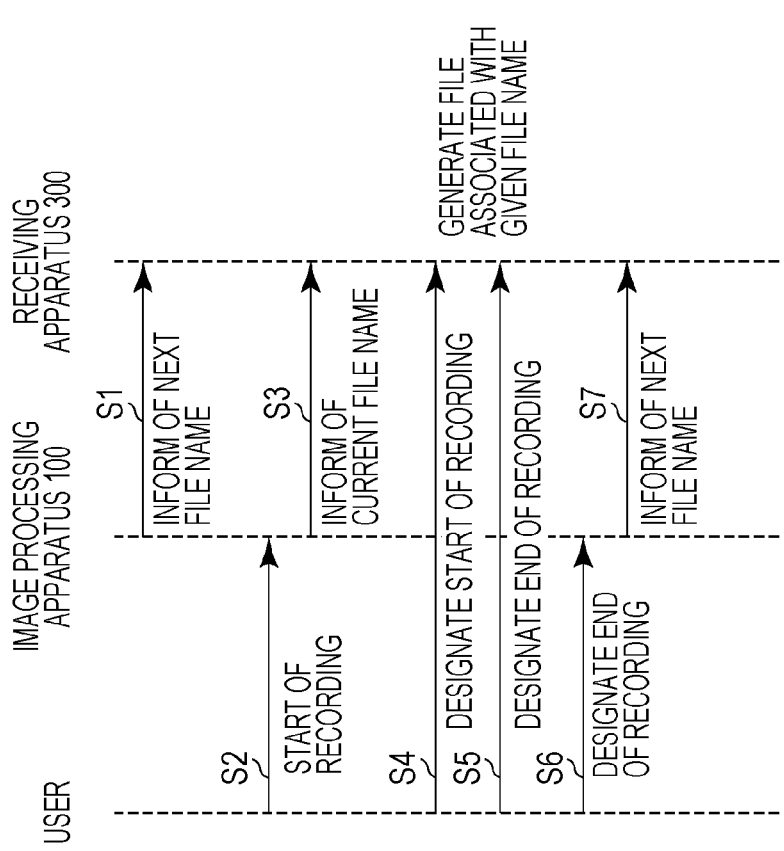
FIG. 9A
FIG. 9B

IMAGE PROCESSING APPARATUS THAT TRANSMITS IMAGE DATA OUTSIDE THE APPARATUS

CROSS-REFERENCE TO RELATED APPLICATIONS

This application is a Continuation of International Patent Application No. PCT/JP2013/060793, filed Apr. 10, 2013, which claims the benefit of Japanese Patent Application No. 2012-101667, filed Apr. 26, 2012, and No. 2012-101668 filed Apr. 26, 2012, both of which are hereby incorporated by reference herein in their entirety.

TECHNICAL FIELD

The present invention relates to, for example, an image processing apparatus that transmits image data outside the apparatus.

BACKGROUND ART

A communication interface, called High-Definition Multimedia Interface (HDMI) (registered trademark), has been developed. A communication system compliant with the HDMI standard includes a source device and a sink device. The source device can transmit image data through the HDMI. The sink device can receive image data from the source device through the HDMI and display an image based on the received image data on a display.

A source device has been known that acquires extended display identification data (EDID), which contains information about a resolution of a sink device, from the sink device (refer to Japanese Patent Laid-Open No. 2009-77347). This source device generates data to be transmitted to the sink device using the EDID acquired from the sink device.

In such a communication system, the source device performs a conversion process for converting image data stored in the source device into image data compliant with a transmission method in the HDMI standard in order to transmit the image data to the sink device. In this case, the source device then transmits the image data generated by the conversion process to the sink device in accordance with the transmission method in the HDMI standard. The sink device receives the image data from the source device and enables the image data received from the source device in accordance with the transmission method in the HDMI standard to be viewed, recorded, edited, and managed. In this case, the source device does not transmit information about the image data, transmitted by the source device, to the sink device. Disadvantageously, it is difficult to manage the image data received from the source device in the sink device.

Additionally, in this case, the source device does not transmit information about the image data to be subjected to the conversion process by the source device to the sink device. Disadvantageously, it is difficult to manage the image data received from the source device in the sink device.

SUMMARY OF INVENTION

According to an aspect of the present invention, image data can be appropriately managed by a sink device.

According to an aspect of the present invention, in cases where image data is transmitted to the sink device, the sink device can be informed of information about the image data transmitted to the sink device.

According to an aspect of the present invention, in the case that image data is transmitted to the sink device, the sink device can be informed of information about the image data to be transmitted to the sink device.

According to an aspect of the present invention, an image processing apparatus includes generating means for generating image data, transmitting means for transmitting predetermined image data to an external device, the predetermined image data being generated by performing a predetermined process for pixel range conversion on the image data, and control means for performing control such that predetermined data relating to the predetermined image data generated by the predetermined process and the predetermined image data are transmitted to the external device.

According to an aspect of the present invention, a method includes the steps of generating image data, generating predetermined image data by performing a predetermined process for pixel range conversion on the image data, and performing control such that predetermined data relating to the predetermined image data generated by the predetermined process and the predetermined image data are transmitted to an external device.

Further features of the present invention will become apparent from the following description of exemplary embodiments with reference to the attached drawings.

BRIEF DESCRIPTION OF DRAWINGS

FIG. 6 is a diagram illustrating an example of additional data according to the first and second embodiments.

FIG. 8 is a diagram illustrating an example of a configuration of a file generated in the receiving apparatus according to the first and second embodiments.

FIGS. 9A and 9B are diagrams illustrating an example of operation for editing image data in the image processing apparatus according to the second embodiment.

DESCRIPTION OF EMBODIMENTS

Embodiments of the present invention will be described below with reference to the drawings. It should be understood that the following embodiments are illustrative only and that the present invention is not limited to the following embodiments.

First Embodiment

Figure 1:
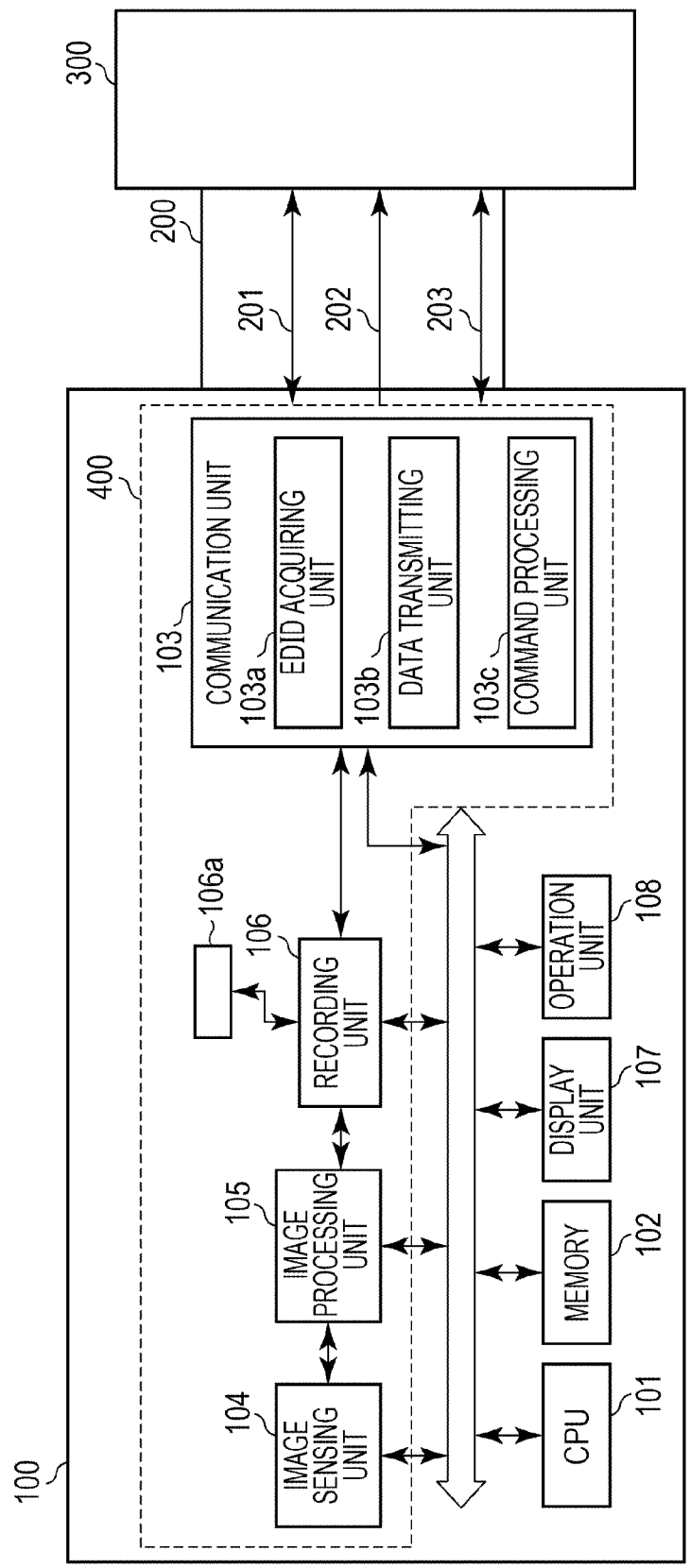
FIG. 1 is a diagram illustrating an example of a communication system according to first and second embodiments.

In a communication system according to a first embodiment, as illustrated in FIG. 1, an image processing apparatus 100 and a receiving apparatus 300 are connected by a connection cable 200 such that the apparatuses can be in communication with each other. The image processing apparatus 100, the connection cable 200, and the receiving apparatus 300 in the communication system according to the first embodiment are devices capable of performing communication compliant with the High-Definition Multimedia Interface (HDMI) (registered trademark) standard. In the first embodiment, the connection cable 200 is a communication interface compliant with the HDMI standard.

The connection cable 200 includes a power line (not illustrated), a hot plug detect (HPD) line (not illustrated), and a display data channel (DDC) line 201. The connection cable 200 further includes a transition-minimized differential signaling (TMDS) line 202 and a consumer electronics control (CEC) line 203.

The image processing apparatus 100 may be an image sensing apparatus, such as a digital single-lens reflex camera, a digital still camera, or a digital video camera, or may be a communication apparatus, such as a mobile phone or a smartphone. The image processing apparatus 100 may be any electronic device including means for generating image data. The receiving apparatus 300 may be a display apparatus, such as a television, a personal computer, or a projector, or may be a recording apparatus, such as a recorder or a hard disk drive.

Figure 2:
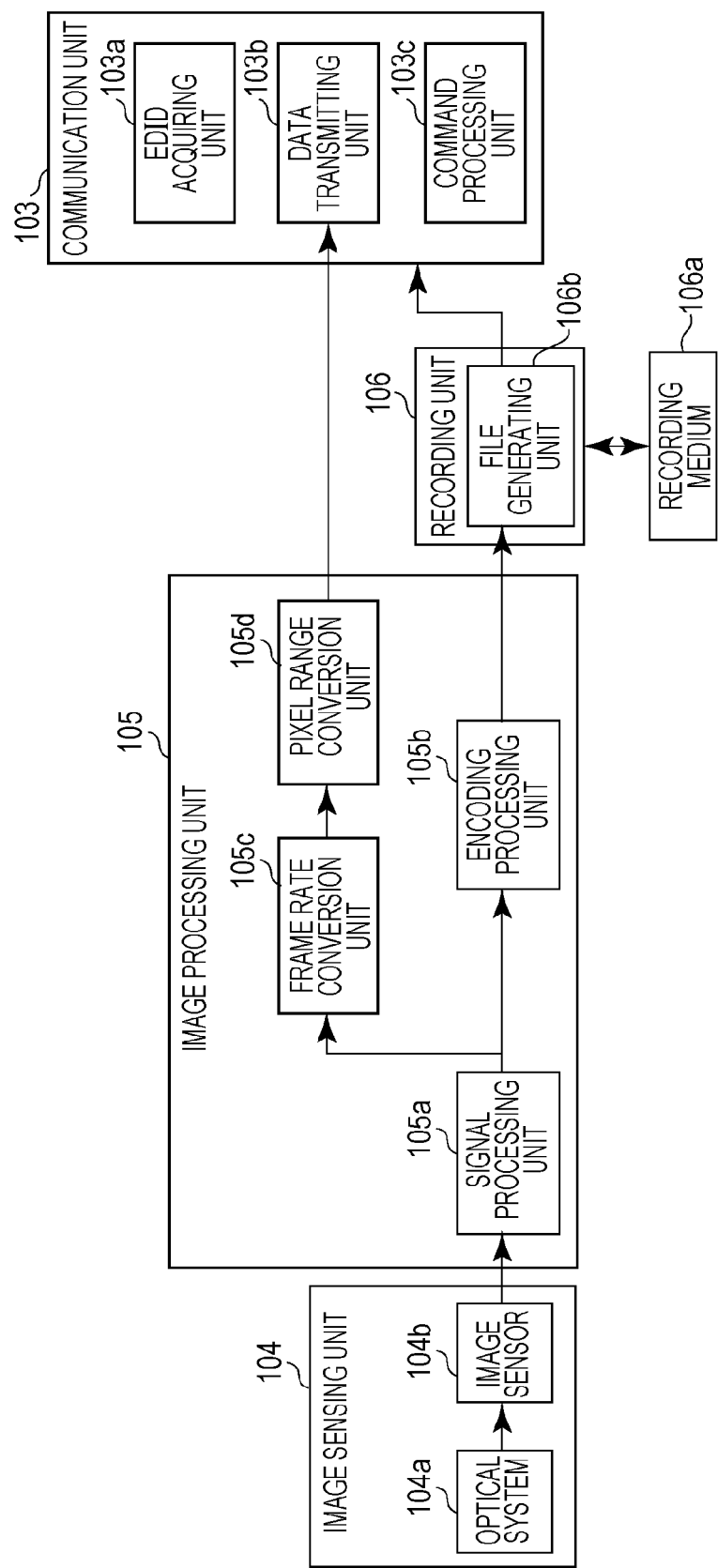
FIG. 2 is a diagram illustrating an example of an image transmission system according to the first and second embodiments.

The image processing apparatus 100 will now be described with reference to FIG. 1. The image processing apparatus 100 includes a central processing unit (CPU) 101, a memory 102, a communication unit 103, an image sensing unit 104, an image processing unit 105, a recording unit 106, a display unit 107, and an operation unit 108. A system including the communication unit 103, the image sensing unit 104, the image processing unit 105, and the recording unit 106 will be referred to as an image transmission system 400. FIG. 2 illustrates a configuration of the image transmission system 400.

The CPU 101 controls an operation of the image processing apparatus 100 in accordance with a computer program stored in the memory 102. The CPU 101 analyzes device information about the receiving apparatus 300 acquired from the receiving apparatus 300, thus determining an image display capability and an audio processing capability of the receiving apparatus 300. The device information about the receiving apparatus 300 is extended display identification data (EDID) or enhanced EDID (E-EDID) recorded in the receiving apparatus 300. The EDID and the E-EDID each contain identification information of the receiving apparatus 300 and information concerning, a resolution, a scanning frequency, an aspect ratio, a color space, and the like supported by the receiving apparatus 300. The E-EDID, serving as enhanced EDID, contains more capability information items than the EDID. The E-EDID contains information concerning formats of video data and audio data supported by the receiving apparatus 300. In the following description, both the EDID and the E-EDID will be referred to as "EDID".

The image processing apparatus 100 acquires EDID from the receiving apparatus 300 through the DDC line 201 and analyzes the EDID acquired through the DDC line 201. The image processing apparatus 100 can determine the image display capability and the audio processing capability of the receiving apparatus 300 based on an analysis of the EDID. Furthermore, the image processing apparatus 100 can generate video data and audio data suitable for the image display capability and the audio processing capability of the receiving apparatus 300.

The memory 102 functions as a work area of the CPU 101. The memory 102 further stores the EDID acquired from the receiving apparatus 300, information concerning the image processing apparatus 100, an analysis by the CPU 101, and the like. The work area of the CPU 101 is not limited to the memory 102 and may include an external memory, such as a hard disk drive.

The communication unit 103 includes a connection terminal (connector) for connection of the connection cable 200. The communication unit 103 further includes an EDID acquiring unit 103a, a data transmitting unit 103b, and a command processing unit 103c.

The EDID acquiring unit 103a acquires EDID through the DDC line 201 from the receiving apparatus 300. The EDID acquired from the receiving apparatus 300 by the EDID acquiring unit 103a is supplied to the CPU 101.

The data transmitting unit 103b transmits video data suitable for the image display capability of the receiving apparatus 300, audio data suitable for the audio processing capability of the receiving apparatus 300, and auxiliary data through the TMDS line 202 to the receiving apparatus 300. The video data and the audio data to be transmitted to the receiving apparatus 300 by the data transmitting unit 103b are generated based on the EDID acquired by the EDID acquiring unit 103a. Image data transmitted to the receiving apparatus 300 by the data transmitting unit 103b may include at least one of still image data and movie data.

The command processing unit 103c can transmit a command compliant with the CEC protocol to the receiving apparatus 300 connected through the CEC line 203. Furthermore, the command processing unit 103c can receive a command compliant with the CEC protocol from the receiving apparatus 300 connected through the CEC line 203.

The command processing unit 103c can supply a command received from the receiving apparatus 300 to the CPU 101. The CPU 101 analyzes the command supplied from the command processing unit 103c and controls the image processing apparatus 100 based on an analysis of the command. A command to be transmitted to the receiving apparatus 300 is generated by the CPU 101.

A configuration of the image sensing unit 104 is illustrated in FIG. 2. The image sensing unit 104 includes an optical system 104a and an image sensor 104b. The image sensing unit 104 photoelectrically converts an object optical image formed by light entered through the optical system 104a to generate analog data. The analog data generated by the image sensing unit 104 is supplied to the image processing unit 105. The image sensor 104b includes a CMOS sensor or a CCD sensor.

A configuration of the image processing unit 105 is illustrated in FIG. 2. The image processing unit 105 includes a signal processing unit 105a, an encoding processing unit 105b, a frame rate conversion unit 105c, and a pixel range conversion unit 105d.

The image processing unit 105 controls the signal processing unit 105a such that the analog data supplied from the image sensing unit 104 is subjected to processes for conversion from analog data to digital data, e.g., gain control and color interpolation, thus generating image data.

The image data generated by the signal processing unit 105a is supplied to the encoding processing unit 105b and the frame rate conversion unit 105c. The image data generated by the signal processing unit 105a is supplied through the encoding processing unit 105b in the recording unit 106. The image data generated by the signal processing unit 105a is supplied to the communication unit 103 through the frame rate conversion unit 105c and the pixel range conversion unit 105d.

The encoding processing unit 105b performs an encoding process on the image data supplied from the signal processing unit 105a. The encoding process includes a process for encoding image data by, for example, adaptive discrete cosine transform (ADCT). Examples of methods of image data encoding include the JPEG method, the MPEG method, and the RAW method. The image data encoded by the encoding processing unit 105b is supplied to the recording unit 106.

The frame rate conversion unit 105c performs a first process for frame rate conversion on the image data supplied from the signal processing unit 105a. The first process includes a process for converting a first frame rate relating to the image data supplied from the signal processing unit 105a into a second frame rate. The first frame rate is a frame rate of the image data supplied from the signal processing unit 105a to the frame rate conversion unit 105c. The second frame rate is a frame rate defined by the HDMI standard for transmission of image data through the TMDS line 202. A frame rate of image data to be transmitted through the TMDS line 202 to the receiving apparatus 300 has to correspond to the second frame rate.

If the first frame rate does not correspond to the second frame rate, the frame rate conversion unit 105c has to convert the first frame rate into the second frame rate. In the case that the first frame rate does not correspond to the second frame rate, the frame rate conversion unit 105c converts the frame rate of image data into the second frame rate and the resultant data is supplied to the pixel range conversion unit 105d. If the first frame rate corresponds to the second frame rate, the frame rate conversion unit 105c supplies image data, which is supplied from the signal processing unit 105a, to the pixel range conversion unit 105d without converting the first frame rate. In the case that the first frame rate corresponds to the second frame rate, the frame rate conversion unit 105c does not perform the first process.

Figure 3:
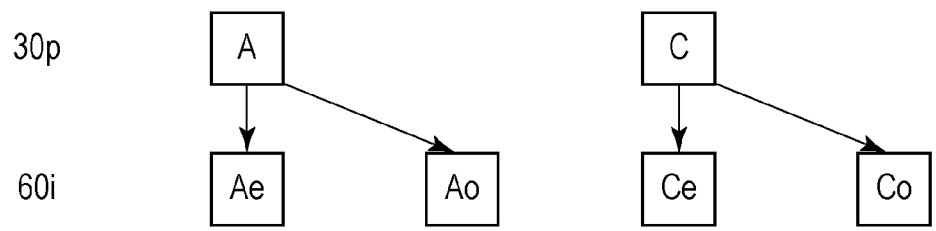
FIG. 3 is a diagram illustrating an example of a first process according to the first and second embodiments.

FIG. 3 illustrates an example of the first process. For example, the first frame rate is 30 p and image data supplied from the signal processing unit 105a to the frame rate conversion unit 105c includes a frame A and a frame C. In this case, the second frame is, for example, 60 i. The frame rate conversion unit 105c divides the frame A relating to the 30 p frame rate into an even-numbered field Ae and an odd-numbered field Ao. The frame rate conversion unit 105c further divides the frame C relating to the 30 p frame rate into an even-numbered field Ce and an odd-numbered field Co. Consequently, the image data relating to the 30 p frame rate is converted into image data relating to a transmission frame rate of 60 i. The frame rate conversion unit 105c supplies the image data subjected to the first process to the data transmitting unit 103b so that the even-numbered field Ae, the odd-numbered field Ao, the even-numbered field Ce, and the odd-numbered field Co are transmitted to the receiving apparatus 300 in that order.

The pixel range conversion unit 105d performs a second process for pixel range conversion on image data supplied from the frame rate conversion unit 105c. Pixel range data indicates a range of black to white levels in video content.

The second process includes a process for converting a first pixel range relating to image data, which is supplied from the frame rate conversion unit 105c, into a second pixel range. The first pixel range is a pixel range of image data supplied from the frame rate conversion unit 105c to the pixel range conversion unit 105d. The second pixel range is a pixel range defined by the HDMI standard for transmission of image data through the TMDS line 202. A pixel range of image data to be transmitted through the TMDS line 202 to the receiving apparatus 300 has to correspond to the second pixel range. If the first pixel range does not correspond to the second pixel range, the pixel range conversion unit 105d has to convert the first pixel range into the second pixel range.

In the case that the first pixel range does not correspond to the second pixel range, the pixel range conversion unit 105d converts the pixel range of image data into the second pixel range and the resultant image data is supplied to the data transmitting unit 103b. If the first pixel range corresponds to the second pixel range, the pixel range conversion unit 105d supplies image data, which is supplied from the frame rate conversion unit 105c, to the data transmitting unit 103b without converting the first pixel range. In the case that the first pixel range corresponds to the second pixel range, the pixel range conversion unit 105d does not perform the second process.

The pixel range conversion unit 105d performs the second process using Equation 1 described below. In Equation 1, a denotes a pixel value of image data supplied from the frame rate conversion unit 105c and b denotes a pixel value of image data to be transmitted to the receiving apparatus 300 by the data transmitting unit 103b.

$$b = a \times \left(\frac{255 - 16}{255}\right) + 16 \qquad (1)$$

Figure 4:
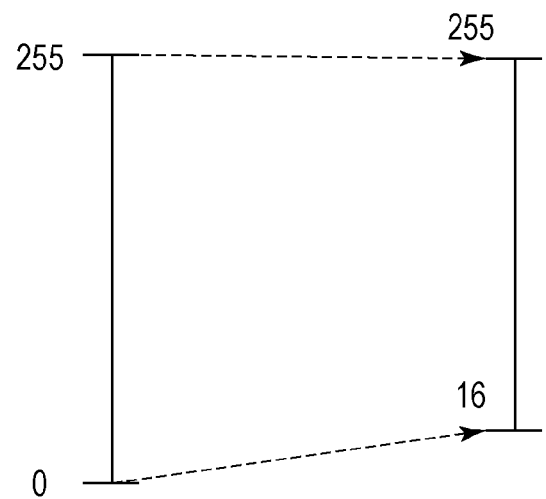
FIG. 4 is a diagram illustrating an example of a second process according to the first and second embodiments.

An example of the second process will now be described with reference to FIG. 4. In this case, for example, the first pixel range is from 0 to 255 (8 bits) and the second pixel range is from 16 to 255 (8 bits). For example, "0" in the first pixel range represents the black level and "255" represents the white level. Furthermore, for example, "16" in the second pixel range represents the black level and "255" represents the white level. In this case, the pixel range of image data supplied from the frame rate conversion unit 105c is converted from the first pixel range of "0 to 255" into the second pixel range of "16 to 255" based on Equation 1 by the pixel range conversion unit 105d. In addition, the image processing unit 105 may generate image data to be supplied to the data transmitting unit 103b based on the EDID acquired by the EDID acquiring unit 103a.

The data transmitting unit 103b transmits image data supplied from the pixel range conversion unit 105d through the TMDS line 202 to the receiving apparatus 300 in response to an instruction from the CPU 101.

A configuration of the recording unit 106 is illustrated in FIG. 2. While being connected to a recording medium 106a, the recording unit 106 can record data in the recording medium 106a. Furthermore, while being connected to the recording medium 106a, the recording unit 106 can read data recorded in the recording medium 106a. While being disconnected from the recording medium 106a, the recording unit 106 cannot record data in the recording medium 106a and read data from the recording medium 106a. The recording medium 106a may be a recording device built in the image processing apparatus 100 or may be an external recording device detachable from the image processing apparatus 100. The recording medium 106a may be a memory card or may be a hard disk drive.

The recording unit 106 includes a file generating unit 106b. The recording unit 106 controls the file generating unit 106b to perform a process for generating a file for image data supplied from the encoding processing unit 105b. A file generated by the file generating unit 106b contains image data encoded by the encoding processing unit 105b and status data relating to the image data. The status data is data indicating setting for generation of the image data. The status data includes data indicating a frame rate of frames included in the image data, data indicating a time code for each frame included in the image data, data indicating the pixel range of the image data, and a file name of the image data.

The file generating unit 106b adds a time code to each frame of image data encoded by the encoding processing unit 105b, thus generating a file. The recording unit 106 records the file generated by the file generating unit 106b in the recording medium 106a. Furthermore, the recording unit 106 can supply status data relating to the file generated by the file generating unit 106b to the communication unit 103.

The display unit 107 includes a display, such as a liquid crystal display. While the image processing apparatus 100 is in a capturing mode, the display unit 107 displays an image based on image data generated by the image sensing unit 104 and the image processing unit 105. While the image processing apparatus 100 is in a playback mode, the display unit 107 displays an image based on image data read from the recording medium 106a.

The operation unit 108 provides a user interface for operating the image processing apparatus 100. The operation unit 108 includes buttons, switches, and a touch panel for operating the image processing apparatus 100. The CPU 101 can control the image processing apparatus 100 in accordance with an instruction entered through the operation unit 108 by a user. If the user operates any button of the operation unit 108, an operation signal associated with the button is supplied from the operation unit 108 to the CPU 101. The CPU 101 analyzes the operation signal supplied from the operation unit 108 and determines a process associated with the operation signal based on an analysis. The CPU 101 controls the image processing apparatus 100 to perform the process associated with the operation signal supplied from the operation unit 108.

The user can set the image processing apparatus 100 to at least one of the capturing mode and the playback mode using the operation unit 108. While the image processing apparatus 100 is in communication with the receiving apparatus 300 through the connection cable 200, the user can set additional data to be transmitted by the data transmitting unit 103b using the operation unit 108. The additional data is data to be transmitted through the TMDS line 202 to the receiving apparatus 300 by the data transmitting unit 103b. The additional data includes data relating to image data to be transmitted through the TMDS line 202 to the receiving apparatus 300 by the data transmitting unit 103b. For example, the additional data includes data indicating the first frame rate to be subjected to the first process by the frame rate conversion unit 105c. The additional data may further include data indicating the second pixel range set by the second process through the pixel range conversion unit 105d. The additional data may further include data indicating a file name of a file generated by the file generating unit 106b. The additional data may further include data indicating a time code for each frame of image data contained in the file generated by the file generating unit 106b.

Figure 5A:
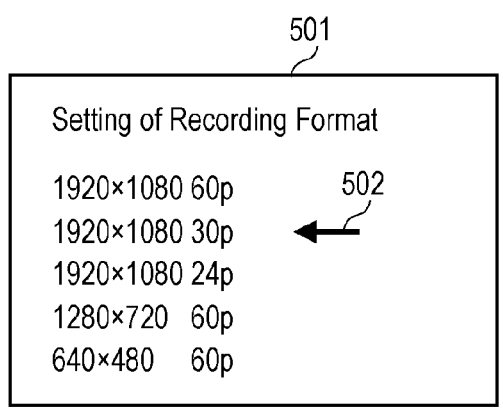
FIGS. 5A and 5B are diagrams illustrating examples of display screen images displayed on an image processing apparatus according to the first and second embodiments.
Figure 5B:
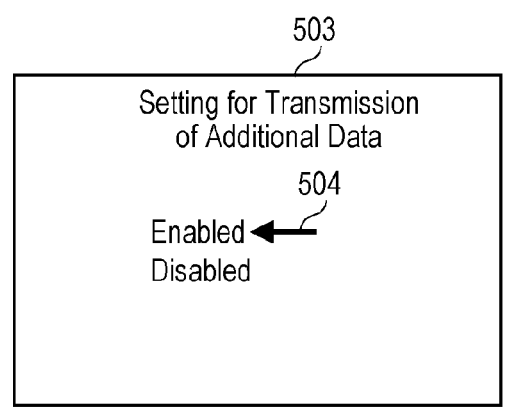

FIGS. 5A and 5B illustrate examples of display screen images displayed on the display unit 107. FIG. 5A illustrates a first screen image 501 that corresponds to image data for setting a recording format of image data to be generated by the optical system 104a, the image sensor 104b, and the signal processing unit 105a. While the first screen image 501 is displayed on the display unit 107, the user can control a cursor 502 using the operation unit 108 so as to select a desired recording format. In this case, the CPU 101 controls the optical system 104a, the image sensor 104b, and the signal processing unit 105a to generate image data in the recording format selected by the cursor 502. Image data recording formats which the user can set using the cursor 502 on the first screen image 501 include a resolution and a frame rate.

FIG. 5B illustrates a second screen image 503 that corresponds to image data for setting whether transmission of additional data is enabled. While the second screen image 503 is displayed on the display unit 107, the user can control a cursor 504 using the operation unit 108 to select transmission or non-transmission of additional data.

In this case, if "Enabled" is selected as setting for transmission of additional data by the cursor 504, the CPU 101 permits image data supplied from the image processing unit 105 to the data transmitting unit 103b and additional data relating to the image data to be transmitted to the receiving apparatus 300.

In this case, if "Disabled" is selected as setting for transmission of additional data by the cursor 504, the CPU 101 permits image data supplied from the image processing unit 105 to the data transmitting unit 103b to be transmitted. In this case, however, the CPU 101 inhibits additional data relating to the image data supplied from the image processing unit 105 to the data transmitting unit 103b from being transmitted.

An operation of the image processing apparatus 100 in the case where the data transmitting unit 103b transmits additional data to the receiving apparatus 300 will now be described. In this case, "Enabled" is selected by the cursor 504 as setting for transmission of additional data.

A case where the image processing apparatus 100 is in the capturing mode and image data generated in a recording format set on the first screen image 501 is recorded in the recording medium 106a will be described below. In this case, the image processing apparatus 100 performs a process for recording image data generated by the image sensing unit 104 and the image processing unit 105 in the recording medium 106a and a process for transmitting the image data generated by the image sensing unit 104 and the image processing unit 105 to the receiving apparatus 300. In this case, the data transmitting unit 103b transmits the image data, which is supplied from the image processing unit 105, and additional data relating to the image data, which is to be transmitted, through the TMDS line 202 to the receiving apparatus 300. In this case, the additional data to be transmitted to the receiving apparatus 300 includes data indicating the first frame rate and data indicating the second pixel range. In this case, the additional data to be transmitted to the receiving apparatus 300 further includes data indicating a file name of a file relating to the image data transmitted to the receiving apparatus 300. In this case, the additional data to be transmitted to the receiving apparatus 300 further includes data indicating a time code for each frame of the image data contained in the file relating to the image data transmitted to the receiving apparatus 300.

A case where the image processing apparatus 100 is in the capturing mode and image data generated by the image sensing unit 104 and the image processing unit 105 is not recorded in the recording medium 106a will be described below. In this case, the image processing apparatus 100 performs a process for generating live view image data using the image sensing unit 104 and the image processing unit 105 and a process for transmitting the image data, which is generated by the image sensing unit 104 and the image processing unit 105, to the receiving apparatus 300. In this case, the data transmitting unit 103b transmits the image data, which is supplied from the image processing unit 105, and additional data relating to the image data, which is to be transmitted, through the TMDS line 202 to the receiving apparatus 300. In this case, the additional data to be transmitted to the receiving apparatus 300 includes data indicating the first frame rate and data indicating the second pixel range. In this case, the additional data to be transmitted to the receiving apparatus 300 includes data indicating a file name of the next file to be recorded. Note that the additional data to be transmitted to the receiving apparatus 300 includes no data indicating a time code. The reason is that the live view image data is generated by the image sensing unit 104 and the image processing unit 105 but a file relating to the live view image data is not generated by the file generating unit 106b.

A case where the image processing apparatus 100 is in the playback mode will be described below. In this case, the image processing apparatus 100 performs a process for reading image data from a file recorded in the recording medium 106a and a process for transmitting the image data read from the recording medium 106a to the receiving apparatus 300. In this case, the image data read from the recording medium 106a is decompressed by a decompression unit (not illustrated) and is then supplied through the frame rate conversion unit 105c and the pixel range conversion unit 105d to the data transmitting unit 103b. In this case, the decompressed image data may be subjected to the first process by the frame rate conversion unit 105c and/or the second process by the pixel range conversion unit 105d. In this case, the data transmitting unit 103b transmits the image data supplied from the image processing unit 105 and additional data relating to the image data, which is to be transmitted, through the TMDS line 202 to the receiving apparatus 300. In this case, the additional data to be transmitted to the receiving apparatus 300 includes data indicating the frame rate of the image data supplied to the frame rate conversion unit 105c after decompression and data indicating the second pixel range. The data indicating the frame rate of the image data supplied to the frame rate conversion unit 105c after decompression is data that indicates the frame rate of the image data to be subjected to the first process by the frame rate conversion unit 105c. In this case, the additional data to be transmitted to the receiving apparatus 300 further includes data indicating a file name of a file relating to the image data to be transmitted to the receiving apparatus 300. In this case, the additional data to be transmitted to the receiving apparatus 300 includes data indicating a time code for each frame of the image data contained in the file relating to the image data to be transmitted to the receiving apparatus 300.

The additional data to be transmitted through the TMDS line 202 to the receiving apparatus 300 by the data transmitting unit 103b can be provided using, for example, Vendor-Specific InfoFrame. Vendor-Specific InfoFrame is packet data that can be defined for each manufacturer (maker).

FIG. 6 illustrates an example of additional data to be transmitted through the TMDS line 202 by the data transmitting unit 103b. It is assumed that the additional data illustrated in FIG. 6 is transmitted for each frame included in image data transmitted by the data transmitting unit 103b. In FIG. 6, HB0 to HB2 correspond to a header of three bytes. Data associated with Vendor-Specific InfoFrame is described in HB0 to HB2. The header (HB0 to HB2) of Vendor-Specific InfoFrame is transmitted from the image processing apparatus 100 to the receiving apparatus 300 through TMDS Channel 0 included in the TMDS line 202.

In FIG. 6, PB0 to PB16 correspond to a body of 17 bytes. Data indicating Vendor ID of the image processing apparatus 100 is described in PB0 to PB2. Vendor ID is identification data indicating a manufacturer (maker) of the image processing apparatus 100.

In PB3 to PB6, data associated with a time code is described. Data indicating a frame number in the time code is described in PB3, data indicating "second" in the time code is described in PB4, data indicating "minute" in the time code is described in PB5, and data indicating "hour" in the time code is described in PB6.

In PB7, data indicating the first frame rate is described. When the first frame rate is "30 p", data representing "30 p" is described in PB7. Data described in PB7 indicates a frame rate of image data generated by the image sensing unit 104 and the image processing unit 105 before the first process. The data described in PB7 consists of eight bits. The most significant bit of the data described in PB7 represents whether image data to be subjected to the first process is interlaced or progressive. When image data to be subjected to the first process is interlaced, the most significant bit of the data described in PB7 is 0. When the image data to be subjected to the first process is progressive, the most significant bit of the data described in PB7 is 1. Low-order seven bits of the data described in PB7 represent a frame or field rate. For example, when the image data to be subjected to the first process is 30 p, the low-order seven bits of the data described in PB7 are "10011110". For example, when the frame rate of the image data to be subjected to the first process is 60 i, the low-order seven bits of the data described in PB7 are "00111100".

In PB8, data indicating the second pixel range is described. The data described in PB8 indicates the pixel range of image data generated after the second process. The data described in PB8 indicates the white level in the second pixel range. Since "16" representing the black level in the second pixel range is defined in the HDMI standard, this level may be omitted in PB8. When the second pixel range is "16 to 255", data representing "255" is described in PB8.

In PB9 to PB16, data indicating a file name is described. The data described in PB9 to PB16 is represented using the American Standard Code for Information Interchange (ASCII) codes. For example, a case where a file corresponding to a file name "MVI_0001" is recorded in the recording medium 106a and image data is transmitted through the TMDS line 202 to the receiving apparatus 300 by the data transmitting unit 103b will be described below. In this case, "0x4D" representing "M" is described in PB9, "0x56" representing "V" is described in PB10, and "0x49" representing "I" is described in PB11. In addition, "0x5f" representing "_" is described in PB12, "0x30" representing "0" is described in each of PB13 to PB15, and "0x31" representing "1" is described in PB16. The body (PB0 to PB16) of Vendor-Specific InfoFrame is transmitted from the image processing apparatus 100 to the receiving apparatus 300 through TMDS Channel 1 and TMDS Channel 2 included in the TMDS line 202.

A method, performed by the image processing apparatus 100, for transmitting data indicating a file name will now be described.

In the case where the image processing apparatus 100 is in the capturing mode and image data generated by the image sensing unit 104 and the image processing unit 105 is being recorded in the recording medium 106a, additional data describes a file name of a file that is being recorded. In this case, the receiving apparatus 300 is informed of the file name of the file which is being recorded in the image processing apparatus 100.

In the case where the image processing apparatus 100 is in the capturing mode and image data generated by the image sensing unit 104 and the image processing unit 105 is not recorded in the recording medium 106a, additional data describes a file name of the next file to be recorded. In this case, the receiving apparatus 300 is informed of the file name of the next file to be recorded in the image processing apparatus 100.

At completion of recording of image data generated by the image sensing unit 104 and the image processing unit 105 in the recording medium 106a, the CPU 101 changes a file name described in additional data to a file name of the next file to be recorded. The same applies to a case where recording of image data generated by the image sensing unit 104 and the image processing unit 105 in the recording medium 106a is stopped. When recording of image data generated by the image sensing unit 104 and the image processing unit 105 in the recording medium 106a is started, the CPU 101 changes a file name described in additional data to a file name of a file which is being recorded.

Figure 7:
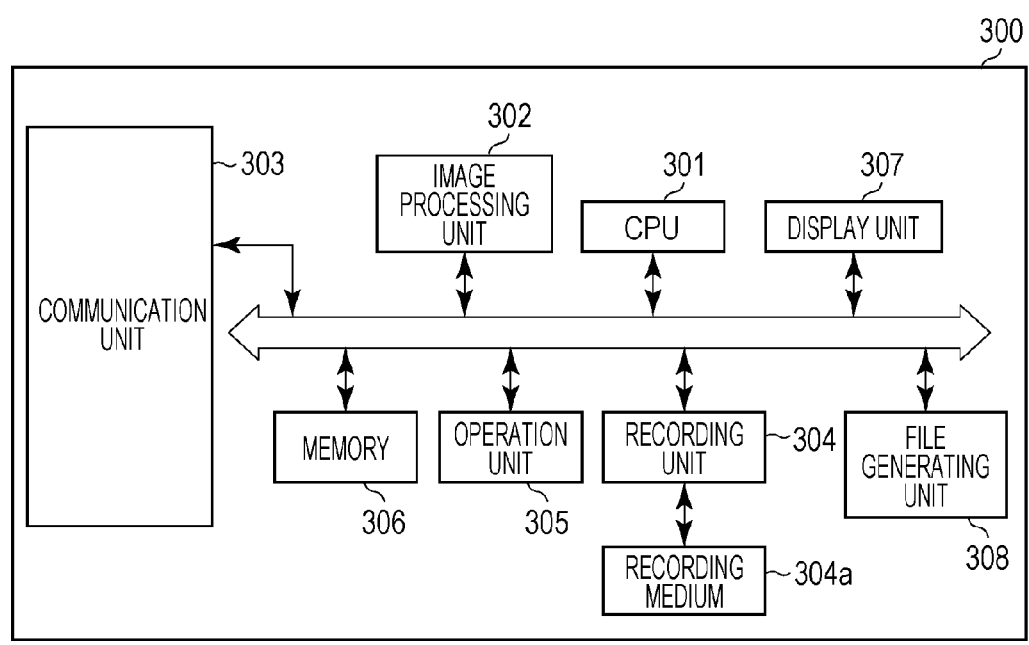
FIG. 7 is a diagram illustrating an example of a receiving apparatus according to the first and second embodiments.

The receiving apparatus 300 will now be described with reference to FIG. 7. The receiving apparatus 300 includes a CPU 301, an image processing unit 302, a communication unit 303, a recording unit 304, an operation unit 305, a memory 306, a display unit 307, and a file generating unit 308.

The CPU 301 controls an operation of the receiving apparatus 300 in accordance with a computer program stored in the memory 306.

The image processing unit 302 performs various image processes on any one of image data read from a recording medium 304a by the recording unit 304 and image data received from the image processing apparatus 100 by the communication unit 303. The image data subjected to the image processes by the image processing unit 302 is supplied to at least one of the recording unit 304 and the display unit 307.

The communication unit 303 includes a connection terminal for connection of the connection cable 200. The communication unit 303 receives image data and additional data transmitted from the image processing apparatus 100 through the TMDS line 202. The image data received from the image processing apparatus 100 by the communication unit 303 is supplied to at least one of the image processing unit 302, the recording unit 304, the display unit 307, and the file generating unit 308. The additional data received from the image processing apparatus 100 by the communication unit 303 is supplied to the file generating unit 308.

The recording unit 304 records image data supplied from the image processing unit 302 in the recording medium 304a. Furthermore, the recording unit 304 can supply image data recorded in the recording medium 304a to at least one of the image processing unit 302 and the display unit 307. The recording medium 304a may be a memory built in the receiving apparatus 300 or may be an external memory removable from the receiving apparatus 300.

The operation unit 305 provides a user interface for operating the receiving apparatus 300.

The memory 306 functions as a work area of the CPU 301. Furthermore, the memory 306 stores EDID to be transmitted to the image processing apparatus 100 through the DDC line 201.

The display unit 307 displays an image based on image data supplied from any one of the communication unit 303, the image processing unit 302, and the recording unit 304.

The file generating unit 308 generates a file using additional data and image data supplied from the communication unit 303. The generated file is supplied to the recording unit 304 and is then recorded in the recording medium 304a.

FIG. 8 illustrates an example of a file generated by the file generating unit 308. The file illustrated in FIG. 8 is generated by the file generating unit 308 upon reception of the additional data illustrated in FIG. 6 from the image processing apparatus 100 by the receiving apparatus 300. The file illustrated in FIG. 8 contains image data, data indicating the file name "MVI_0001", data indicating the first frame rate "30 p", and data indicating the second pixel range "16 to 255". The file illustrated in FIG. 8 further contains data items indicating time codes for frames of the image data. The file generating unit 308 generates the data indicating the file name, the data indicating the first frame rate, and the data indicating the second pixel range, which are contained in the file of FIG. 8, based on the additional data received from the image processing apparatus 100. In addition, the file generating unit 308 generates the data items indicating the time codes for the frames of the image data contained in the file of FIG. 8 based on the additional data received from the image processing apparatus 100. The file generating unit 308 associates the time code for each frame described in the additional data supplied from the communication unit 303 with the corresponding frame included in the image data supplied from the communication unit 303, thus generating the file. According to digital camera system requirements, in cases where the file generating unit 308 generates a file containing image data received from the image processing apparatus 100, the receiving apparatus 300 cannot specify a file name of the generated file to the image processing apparatus 100.

The receiving apparatus 300 generates the file illustrated in FIG. 8, so that the receiving apparatus 300 can manage the image data received from the image processing apparatus 100 together with data relating to the image data to be transmitted by the image processing apparatus 100. In addition, the receiving apparatus 300 can control the image processing unit 302 to edit image data received from the image processing apparatus 100 using additional data received from the image processing apparatus 100. Accordingly, the receiving apparatus 300 can reconstruct image data to be transmitted by the image processing apparatus 100.

As described above, when image data is transmitted from the image processing apparatus 100 according to the first embodiment to the receiving apparatus 300, data relating to the image data to be transmitted is transmitted to the receiving apparatus 300 by the image processing apparatus 100. Accordingly, the receiving apparatus 300 can determine what the image data received from the image processing apparatus 100 has been before transmission. Consequently, if image data generated in the image processing apparatus 100 has been subjected to a conversion process for transmission to the receiving apparatus 300, the receiving apparatus 300 can reconstruct the image data to be subjected to the conversion process. Accordingly, if the image quality of image data received by the receiving apparatus 300 has been degraded by the conversion process, the receiving apparatus 300 can reconstruct high-quality original image data from the image data received from the image processing apparatus 100. In this case, the receiving apparatus 300 can record the high-quality image data generated in the image processing apparatus 100. Furthermore, the receiving apparatus 300 can edit the high-quality image data generated in the image processing apparatus 100. In addition, the receiving apparatus 300 enables the high-quality image data generated in the image processing apparatus 100 to be viewed. When transmitting image data to the receiving apparatus 300, therefore, the image processing apparatus 100 informs the receiving apparatus 300 of data relating to the image data to be transmitted to the receiving apparatus 300, thus enabling the receiving apparatus 300 to appropriately manage the image data.

Furthermore, the image processing apparatus 100 informs the receiving apparatus 300 of the second pixel range, thus enabling the receiving apparatus 300 to determine whether the pixel range of the image data transmitted to the receiving apparatus 300 is "16 to 255" or "16 to 235".

In addition, the image processing apparatus 100 informs the receiving apparatus 300 of a file name and time codes, thus enabling the receiving apparatus 300 to generate a file whose file name and time codes are identical to those of a file recorded in the image processing apparatus 100.

Although additional data is transmitted to the receiving apparatus 300 using Vendor-Specific InfoFrame in the first embodiment, packet data is not limited to Vendor-Specific InfoFrame.

For example, the image processing apparatus 100 may inform the receiving apparatus 300 of at least one of the first frame rate, the second pixel range, and the time codes using Source Product Descriptor InfoFrame.

Furthermore, for example, the image processing apparatus 100 may inform the receiving apparatus 300 of additional data using HDMI Ethernet (registered trademark) Channel (HEC). In this case, the additional data is transmitted from the image processing apparatus 100 to the receiving apparatus 300 via Ethernet (registered trademark).

Furthermore, for example, the image processing apparatus 100 may inform the receiving apparatus 300 of additional data using a command compliant with the CEC protocol. In this case, the command compliant with the CEC protocol is, for example, <Vendor Command with ID>. The <Vendor Command with ID> is a command that contains Vendor ID and can be defined for each manufacturer (maker). In this case, the additional data is transmitted from the image processing apparatus 100 to the receiving apparatus 300 through the CEC line 203.

Second Embodiment

In a second embodiment, a description of the same components as those in the first embodiment is omitted and the difference between the second embodiment and the first embodiment will be described below.

An image processing apparatus 100 according to the second embodiment transmits additional data using <Vendor Command with ID> defined in the CEC protocol to a receiving apparatus 300. In this case, the receiving apparatus 300 records a file whose file name and time codes are identical to those of a file recorded in the image processing apparatus 100 based on the additional data received from the image processing apparatus 100 using <Vendor Command with ID>.

An operation of the image processing apparatus 100 and an operation of the receiving apparatus 300 in editing of image data will be described below with reference to FIGS. 9A and 9B.

FIG. 9A illustrates a process in which a file recorded in the image processing apparatus 100 is used as a main image and a file generated based on additional data by the receiving apparatus 300 is used as a proxy image.

In cases where a data transmitting unit 103b transmits image data to the receiving apparatus 300 through a TMDS line 202 and image data generated by an image sensing unit 104 and an image processing unit 105 is not recorded in a recording medium 106a, a CPU 101 performs a process in S1. In S1, the CPU 101 controls a command processing unit 103c to transmit <Vendor Command with ID> containing a file name of the next file to be recorded by the image processing apparatus 100 to the receiving apparatus 300. Hereinafter, <Vendor Command with ID> containing the file name of the next file to be recorded by the image processing apparatus 100 will be referred to as a "first command". The first command contains data indicating the first frame rate and data indicating the second pixel range.

In S2, the user inputs an operation signal to start recording of image data through an operation unit 108 to the image processing apparatus 100. In this case, the CPU 101 controls a file generating unit 106b to generate a file containing image data generated by the image sensing unit 104 and the image processing unit 105. In this case, in S3, the CPU 101 controls the command processing unit 103c to transmit <Vendor Command with ID> containing a file name of the file generated by the file generating unit 106b to the receiving apparatus 300. Hereinafter, <Vendor Command with ID> containing the file name of the file generated by the file generating unit 106b will be referred to as a "second command". The second command further contains data indicating the first frame rate, data indicating the second pixel range, and data indicating time codes for image data contained in the file to be recorded in the recording medium 106a.

In S4, the user inputs an operation signal to start recording of image data through an operation unit 305 to the receiving apparatus 300. In this case, a CPU 301 controls a file generating unit 308 to generate a file using the image data received from the image processing apparatus 100 by a communication unit 303 and the second command transmitted from the image processing apparatus 100 in S3. In this case, the file generating unit 308 generates the file whose file name and time codes are identical to those of the file generated by the file generating unit 106b.

In S5, the user inputs an operation signal to end the recording of the image data through the operation unit 305 to the receiving apparatus 300. In this case, the CPU 301 controls a recording unit 304 to record the file generated by the file generating unit 308 in a recording medium 304a.

In S6, the user inputs an operation signal to end the recording of the image data through the operation unit 108 to the image processing apparatus 100. In this case, the CPU 101 controls a recording unit 106 to record the file generated by the file generating unit 106b in the recording medium 106a. After that, image data generated by the image sensing unit 104 and the image processing unit 105 is not recorded in the recording medium 106a.

Subsequently, in S7, the CPU 101 controls the command processing unit 103c to transmit the first command to the receiving apparatus 300 in the same way as in the process in S1. The process in S7 is performed by the CPU 101 until an operation signal to start recording of image data is input through the operation unit 108 to the image processing apparatus 100.

FIG. 9B illustrates a process in which a file recorded in the image processing apparatus 100 is used as a proxy image and a file generated based on additional data by the receiving apparatus 300 is used as a main image.

In cases where the data transmitting unit 103b transmits image data through the TMDS line 202 to the receiving apparatus 300 and image data generated by the image sensing unit 104 and the image processing unit 105 is not recorded in the recording medium 106a, the CPU 101 performs a process in S11. In S11, the CPU 101 controls the command processing unit 103c to transmit the first command to the receiving apparatus 300 in the same way as in the process in S1.

In S12, the user inputs an operation signal to start recording of image data through the operation unit 305 to the receiving apparatus 300. In this case, the CPU 301 controls the file generating unit 308 to generate a file using image data received from the image processing apparatus 100 by the communication unit 303 and the first command transmitted from the image processing apparatus 100 in S11.

In S13, the user inputs an operation signal to start recording of image data through the operation unit 108 to the image processing apparatus 100. In this case, the CPU 101 controls the file generating unit 106b to generate a file containing image data generated by the image sensing unit 104 and the image processing unit 105. In this case, in S14, the CPU 101 controls the command processing unit 103c to transmit the second command to the receiving apparatus 300. In this case, the CPU 301 controls the file generating unit 308 to replace a file name contained in the file generated in S12 with a file name contained in the second command transmitted from the image processing apparatus 100 in S14. Furthermore, in this case, the CPU 301 adds data indicating time codes contained in the second command transmitted from the image processing apparatus 100 in S14 to the file generated in S12.

In S15, the user inputs an operation signal to end the recording of the image data through the operation unit 108 to the image processing apparatus 100. In this case, the CPU 101 controls the recording unit 106 to record the file generated by the file generating unit 106b in the recording medium 106a. After that, image data generated by the image sensing unit 104 and the image processing unit 105 is not recorded in the recording medium 106a.

In S16, the CPU 101 controls the command processing unit 103c to transmit the first command to the receiving apparatus 300 in the same way as in S11. The CPU 101 performs a process in S16 until an operation signal to start recording of image data is input through the operation unit 108 to the image processing apparatus 100.

In S17, the user inputs an operation signal to end the recording of the image data through the operation unit 305 to the receiving apparatus 300. In this case, the CPU 301 controls the recording unit 304 to record the file generated by the file generating unit 308 in the recording medium 304a.

If the first frame rate in the first command differs from the first frame rate in the second command, the CPU 301 may replace the first frame rate described in the file generated by the file generating unit 308 with the latest first frame rate. Furthermore, if the second pixel range in the first command differs from the second pixel range in the second command, the CPU 301 may replace the second pixel range described in the file generated by the file generating unit 308 with the latest second pixel range.

As described above, the image processing apparatus 100 according to the second embodiment informs the receiving apparatus 300 of a file name and time codes, thus enabling the receiving apparatus 300 to generate a file whose file name and time codes are identical to those of the file recorded in the image processing apparatus 100. In editing image data, therefore, the image processing apparatus 100 according to the second embodiment enables a file recorded in the image processing apparatus 100 to be used as a main image and enables a file generated in the receiving apparatus 300 to be used as a proxy image. Furthermore, in editing image data, the image processing apparatus 100 according to the second embodiment enables a file recorded in the image processing apparatus 100 to be used as a proxy image and enables a file generated in the receiving apparatus 300 to be used as a main image.

The first frame rate in the first and second embodiments is not limited to 30 p.

The second pixel range in the first and second embodiments is not limited to "16 to 255". The second pixel range may be "64 to 1023" in a system that represents a color space with a 10-bit width. In this case, the black level in the second pixel range is "64" and the white level in the second pixel range is "1023".

The image processing apparatus 100, the connection cable 200, and the receiving apparatus 300 in the first and second embodiments may be compliant with a standard compatible with the HDMI standard.

The image processing apparatus 100, the connection cable 200, and the receiving apparatus 300 in the first and second embodiments may be compliant with the Digital Visual Interface (DVI) (registered trademark) standard.

Furthermore, the image processing apparatus 100, the connection cable 200, and the receiving apparatus 300 in the first and second embodiments may be compliant with the Display Port (registered trademark) standard.

In addition, the image processing apparatus 100, the connection cable 200, and the receiving apparatus 300 in the first and second embodiments may be compliant with the Digital Interface for Video and Audio (DiiVa).

The image processing apparatus 100, the connection cable 200, and the receiving apparatus 300 in the first and second embodiments may be compliant with the Mobile High-definition Link (MHL) (registered trademark) standard.

The image processing apparatus 100, the connection cable 200, and the receiving apparatus 300 in the first and second embodiments may be compliant with the Universal Serial Bus (USB) standard.

Furthermore, image data generated by the image processing apparatus 100 in the first and second embodiments may be transmitted to the receiving apparatus 300 in a wireless manner. Accordingly, the image processing apparatus 100 and the receiving apparatus 300 in the first and second embodiments may be compliant with the Wireless HD (registered trademark) standard. In addition, the image processing apparatus 100 and the receiving apparatus 300 in the first and second embodiments may be compliant with the Wireless Home Digital Interface (WHDI) standard.

Other Embodiments

An image processing apparatus according to the present invention is not limited to the image processing apparatus 100 described in the first and second embodiments. Furthermore, a receiving apparatus according to the present invention is not limited to the receiving apparatus 300 described in the first and second embodiments. The image processing apparatus according to the present invention can be implemented by, for example, a system including a plurality of devices. Furthermore, the receiving apparatus according to the present invention can be implemented by, for example, a system including a plurality of devices.

Furthermore, the processes, configurations, functions, and systems described in the first and second embodiments can be implemented by a computer program executable by a computer. In this case, the computer program is read from a computer-readable recording medium by the computer and is executed by the computer. In this case, examples of the computer-readable recording medium include a hard disk drive, an optical disk, a CD-ROM, a CD-R, a memory card, and a ROM. The computer program may be provided from an external device through a communication interface to the computer and be executed by the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
a generating unit that generates a second video image by using a first video image so that a range between a white level for the second video image and a black level for the second video image is a range defined by a specific communication standard, wherein the second video image includes sequential frames;
a first transmitting unit that transmits the second video image to an external device in accordance with the specific communication standard; and
a second transmitting unit that transmits predetermined data for each frame included in the second video image to the external device, wherein the predetermined data includes information about the range between the white level for the second video image and the black level for the second video image.

2. The image processing apparatus according to claim 1, wherein the predetermined data includes information indicating a name of a file relating to the second image.

3. The image processing apparatus according to claim 1, wherein the predetermined data includes information indicating a time code relating to each frame included in the second image.

4. The image processing apparatus according to claim 1, wherein the generating unit generates the second video image by using the first video image so that a frame rate of the second video image is a frame rate defined by the specific communication standard, and
wherein the predetermined data includes information indicating the frame rate of the first image.

5. The image processing apparatus according to claim 1, further comprising an image sensor that converts an optical image to analog data, wherein the first video image is obtained by using the image sensor.

6. The image processing apparatus according to claim 1, further comprising a reading unit that reads image from a recording medium, wherein the first video image is video image read by the reading unit.

7. The image processing apparatus according to claim 1, wherein the generating unit generates the second video image by using information relating to a display capability of the external device.

8. The image processing apparatus according to claim 7, wherein the information relating to a display capability of the external device is at least one of Extended display identification data (EDID) and Enhanced Extended display identification data (E-EDID).

9. The image processing apparatus according to claim 1, wherein the predetermined data includes information indicating that a format of the first video image is an interlaced format or a progressive format.

10. The image processing apparatus according to claim 1, wherein the second transmitting unit transmits the predetermined data to the external device according to Ethernet.

11. The image processing apparatus according to claim 1, wherein the second transmitting unit transmits the predetermined data to the external device according to High-Definition Multimedia Interface (HDMI).

12. The image processing apparatus according to claim 1, wherein the predetermined data is used for causing the external device to edit the second video image transmitted from the image processing apparatus.

13. The image processing apparatus according to claim 1, wherein the predetermined data is used for causing the external device to generate the first video image from the second video image.

14. The image processing apparatus according to claim 1, wherein the image processing apparatus includes a camera.

15. A method comprising:
generating a second video image by using a first video image so that a range between a white level for the second video image and a black level for the second video image is a range defined by a specific communication standard, wherein the second video image includes frames;
transmitting the second video image to an external device in accordance with the specific communication standard; and
transmitting predetermined data for each frame included in the second video image to the external device, wherein the predetermined data includes information about a range between a white level for the second video image and a black level for the second video image.

* * * * *